(12) United States Patent
Gorin et al.

(10) Patent No.: US 11,718,934 B2
(45) Date of Patent: Aug. 8, 2023

(54) MANUFACTURE OF COMPOSITE DISPERSION BASED RESIN-INFUSED RANDOM FIBER MAT

(71) Applicant: Dow Global Technologies LLC, Midland, MI (US)

(72) Inventors: Craig F. Gorin, Midland, MI (US); Manesh Nadupparambil Sekharan, Freeport, TX (US); Jason A. Reese, Auburn, MI (US); Amit K. Chaudhary, Midland, MI (US); Daniel L. Dermody, Midland, MI (US); Kevin J. Bouck, Broomfield, CO (US); Rebekah K. Feist, Midland, MI (US); Thomas J. Parsons, Midland, MI (US); David H. Bank, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 618 days.

(21) Appl. No.: 16/494,578

(22) PCT Filed: Feb. 14, 2018

(86) PCT No.: PCT/US2018/018144
§ 371 (c)(1),
(2) Date: Sep. 16, 2019

(87) PCT Pub. No.: WO2018/175017
PCT Pub. Date: Sep. 27, 2018

(65) Prior Publication Data
US 2021/0115202 A1  Apr. 22, 2021

Related U.S. Application Data

(60) Provisional application No. 62/474,397, filed on Mar. 21, 2017.

(51) Int. Cl.
| | | |
|---|---|---|
| D04H 1/64 | (2012.01) | |
| B29B 15/12 | (2006.01) | |
| B29C 70/18 | (2006.01) | |
| C08J 3/21 | (2006.01) | |
| C08J 5/04 | (2006.01) | |
| D04H 3/12 | (2006.01) | |
| D21H 13/50 | (2006.01) | |

(Continued)

(52) U.S. Cl.
CPC ............... *D04H 1/64* (2013.01); *B29B 15/12* (2013.01); *B29C 70/18* (2013.01); *C08J 3/212* (2013.01);
(Continued)

(58) Field of Classification Search
CPC ............ Y10T 442/60; Y10T 428/1362; Y10T 428/24994; B29C 70/00; B29C 70/18;
(Continued)

(56) References Cited

U.S. PATENT DOCUMENTS

| | | |
|---|---|---|
| 4,654,100 A | 3/1987 | Yats et al. |
| 5,393,379 A | 2/1995 | Parrinello |

(Continued)

FOREIGN PATENT DOCUMENTS

| | | |
|---|---|---|
| EP | 825012 | 2/1998 |
| GB | 1397665 | 6/1975 |

(Continued)

OTHER PUBLICATIONS

Examples of High Polarity Solvents—Chemistry Examples, accessed online, Apr. 3, 2022.*

(Continued)

*Primary Examiner* — Camie S Thompson (57) ABSTRACT

A method of preparing a resin infused random fiber mat including the step of forming a liquid dispersion mat of polymeric resin and fiber on a porous substrate.

12 Claims, 2 Drawing Sheets

(51) Int. Cl.
*D21H 17/52* (2006.01)
*D21H 21/14* (2006.01)
*B29K 307/04* (2006.01)

(52) U.S. Cl.
CPC .............. *C08J 5/042* (2013.01); *D04H 3/12* (2013.01); *D21H 13/50* (2013.01); *D21H 17/52* (2013.01); *D21H 21/14* (2013.01); *B29K 2307/04* (2013.01); *C08J 2363/00* (2013.01)

(58) Field of Classification Search
CPC ......... B29C 41/02; B29B 15/12; B29B 11/16; B29K 2307/04; C08J 3/215; C08J 2363/00; C08J 5/042; C08J 5/24; C08J 5/06; D04H 3/12; D04H 1/64; D21H 13/50; D21H 17/52
USPC ......... 164/164.3, 164.1, 164; 156/246, 62.2; 442/327; 428/297.4, 36.1; 264/109, 101, 264/87, 86, 128, 257; 523/334
See application file for complete search history.

(56) References Cited

U.S. PATENT DOCUMENTS

| | | | |
|---|---|---|---|
| 5,539,021 | A | 7/1996 | Pate et al. |
| 5,539,025 | A | 7/1996 | Smith et al. |
| 5,688,842 | A | 11/1997 | Pate, III et al. |
| 6,004,493 | A * | 12/1999 | Hussong ............ B28B 1/52 264/154 |
| 6,508,906 | B1 | 1/2003 | Bradish |
| 8,063,128 | B2 | 11/2011 | Moncla et al. |
| 2005/0100754 | A1 | 5/2005 | Moncla et al. |
| 2007/0006775 | A1 | 1/2007 | Helwig |
| 2007/0042659 | A1 | 2/2007 | Xing et al. |
| 2007/0264895 | A1 | 11/2007 | Jaffee et al. |
| 2010/0261014 | A1 | 10/2010 | Geiger, Jr. |
| 2014/0262088 | A1 | 9/2014 | Deka |
| 2015/0175755 | A1 | 6/2015 | Sekharan et al. |
| 2015/0218413 | A1 | 8/2015 | Sekharan et al. |

FOREIGN PATENT DOCUMENTS

| | | |
|---|---|---|
| WO | 0111138 | 2/2001 |
| WO | 2005091792 A2 | 10/2005 |
| WO | 2009074293 | 6/2009 |
| WO | 2011007184 A2 | 1/2011 |

OTHER PUBLICATIONS

Harbers, T., et al., "Highly Efficient Production and Characterization of CFRP Made from Recycled Carbon Fibers," SAMPE Journal, 2014, p. 7, vol. May/Jun. 50, No. 3.

* cited by examiner

MANUFACTURE OF COMPOSITE DISPERSION BASED RESIN-INFUSED RANDOM FIBER MAT

FIELD OF THE INVENTION

The invention relates generally to the manufacture of resin fiber mats. More specifically, the invention relates to a single step process for manufacture of composite dispersion based resin-infused random fiber mats.

BACKGROUND OF THE INVENTION

The drive towards higher strength and lighter weight materials has been motivated by many needs including energy costs, industrial applications and the simple evolution of technology. Composite materials are one product of this movement.

Composites, materials comprising polymeric resins and organic/inorganic fibrous materials are used readily in many industries including transportation such as the automotive and aircraft industries. While used readily, the processes for formulating and applying these materials may be labor intensive.

There are currently a variety of methods used to form random mats from carbon fiber. This includes wet-laid processes, such as those disclosed in U.S. Publication No. 2014/0262088 A1 which describes a two-step method for molded non-woven carbon fiber containing mats. A process is disclosed for forming a mat through a wet laid method that includes thermoplastic multi-component fibers which can act as resin when melted. An alternative process is disclosed for forming the mat followed by impregnation with resin followed by molding.

Other processes are disclosed in U.S. Publication No. 2007/0006775 A1, using glass fibers. In addition, a process where fibers are removed from a slurry through a vacuum head is described in U.S. Publication No. 2010/0261014 A. This two-step process is also disclosed for the use of recycled carbon fibers in a SAMPE Journal article, Vol. 50, No 3, May/June 2014 p. 7, and in an associated LCC symposium slide deck.

These disclosures require that additional resin must be infused in a second processing step after formation of the mat. In addition, because the mat is already formed, there may be uneven wetting or incomplete infusion of the resin, and there are generally issues with filtration of components such as the resin or the catalyst. One further method for infusion with a low viscosity epoxy and molding with a higher viscosity epoxy requires an intermediate B-staging step. The low viscosity epoxy is advanced without being fully cured to form the higher viscosity epoxy during the process.

A sheet molding compound (SMC) process is described in U.S. Pat. No. 6,508,906 B1. In this process, fibers are sprinkled to form a randomized web followed by infusion of epoxy. As a result, the tows may not be fully separated and randomized during processing; fiber bundles may remain, negatively impacting final part strength. In addition, epoxy is applied as a paste from either side of the mat, hindering full infusion and wetting, again impacting strength.

Other prior examples of wet-laid mat making processes include U.S. Pat. No. 4,654,100 and EP Patent No. 825012A1. In these examples, the mats are formed by trapping both the fiber and resin as solid particles through filtration.

U.S. Pat. No. 4,654,100 describes a general process for forming random fiber thermoset based composites through a wet-laid technique containing a latent curing agent. However, the disclosed formulation is an aqueous slurry of fiber, thermoset and catalyst powder, which is then destabilized by the addition of a flocculant. The resulting system is an aggregation of resin particles separated from water. This allows the solids, both fiber and agglomerated thermoset and catalyst, to be collected on a mesh screen. The result may be an uneven coating of resin on the fiber in the composite.

A second example is found in EP Patent No. 825012A1, where a continuous belt process is used to form mats from a slurry of chopped fibers and thermoplastic resin. In this case, the fiber and resin (as a solid powder dispersed in water) is mixed and poured on a continuous mesh belt. The slurry is then filtered through a mesh belt with holes smaller than the grain size of the thermoplastic resin. Here again, there is a complexity of multiple steps and further processing.

As a result, there is a need for further development in the area of resin-infused fiber mats.

SUMMARY OF THE INVENTION

The claimed invention is a process that enables the formation of infused prepreg mats in only one major processing step. An unexpected advantage is fully wetting, separating, and randomizing the carbon fiber tows, as well as enabling full and even infusion of a significant fraction of higher molecular weight epoxy resin into the mat.

A further advantage of the claimed invention is in utilization of the dispersions described herein. Specifically, no filtering effect (that is, modification of catalyst:resin:water ratio) was observed during this process. As a result, the invention enables reuse of the dispersion diluent. The dispersion can be reused, as no filtration or destabilization is caused. A more homogeneous distribution and infusion of resin can be realized than from inhomogeneous agglomerated particle filtering. As the mechanism for destabilization in the prior art requires interaction with flocculants, the particles would be limited to those containing charged surfactants or dispersants, which have been shown to interfere with cure kinetics.

In addition, the use of low-viscosity dispersion, even with high molecular weight thermoset, enables easy pickup of the resin without destroying the integrity of the mat. The mechanical structure of the mat also enables easier drying. The random fiber mat has an open structure allowing for easier water evolution/drying. The mat may also retain good mechanical integrity allowing for drying without loss of individual fibers.

No filtering of the polymer particles from the slurry is necessary with the claimed invention. Instead, only the carbon fibers containing absorbed aqueous dispersion is filtered. This allows much larger mesh pore size (enabling faster filtration) and less clogging. It also enables reuse of the dispersion. The claimed invention provides even wetting and good infusion by coating fibers through the drying process (required for final part properties) rather than relying on filtration of inhomogeneous large particles for even distribution of resin into fiber for molding which would lead to more defects.

The claimed invention also enables the use of a dispersion with a high solids content of a wide variety of polymer types, sizes, and additional components, all while retaining low viscosity.

The claimed invention allows for mat formation by trapping fibers that contain absorbed liquid dispersion. One advantage of this is that liquid components can now be included in the formulation. In addition, in our system a high viscosity and high molecular weight epoxy can be infused using a low viscosity system.

No destabilization of the polymer from the dispersion is required with the claimed invention. Instead, the stable dispersion is added in an amount to provide the desired resin:fiber ratio after drying. The drying process enables even coating of thermoset onto the individual fibers. The mechanical dispersion process also enables stable dispersions with small particle size and high solid loading at low viscosity.

DETAILED DESCRIPTION OF THE PREFERRED EMBODIMENTS

In accordance with one aspect of the invention, a wet laid process is used to produce a fiber polymer resin composite. A slurry of carbon fiber in an aqueous dispersion of thermoplastic or thermosetting polymer resin is formulated. The slurry is then deposited on a porous surface or substrate to form a wet laid mat supported by the substrate. Excess dispersion is then removed from the mat to obtain the desired quantity of resin and fiber. Excess water is further then removed from the mat to obtain a dry sheet. The dried sheet is then molded to obtain the desired shape along with curing the thermoset to obtain the final composite part.

Processing

In accordance with one aspect of the invention, a slurry of polymeric resin and fiber are prepared in an aqueous solvent. Generally, the solvent used may have a polarity index rating ranging from about 5 to about 9. The resin and fiber are prepared through mixing in the form of a dispersion along with various adjuvants, depending on the polymeric resin used such as curing agents, hardeners, plasticizers, etc. Representative concentrations for the slurry may be found in TABLE I found herein. In practice, the polymeric resins and adjuvants are dispersed in the aqueous solvent and the fibers are then added and mixed until the fibers are preferably dispersed and randomized.

The slurry is formed into a mat by immediate deposition onto a porous substrate such as a steel mesh screen. The process of the invention is facilitated in part by the low viscosity of the liquid dispersion which ranges from about 10 cps to 5000 cps at 22° C., preferably less than 2000 cps and more preferably less than 1000 cps at 22° C.

Once the mat is formed, it is stable and easily moved from the substrate. The mat may then be dried and cured as desired.

The Composite Article

The composite of the invention generally comprises a fiber and polymer resin along with any number of adjuvants necessary to impart various desired properties to the finished article.

Fibrous Material

The composite material of the invention includes one or more fibrous materials suitable for blending with the resin and reinforcing the composite material. The fibers may be in any form. For example, the fibers may include: short fibers, long fibers, non-woven fibers, woven fibers, or any combination thereof. The fibers may be oriented in a plurality of directions. For example, one fiber may be oriented in a first direction and a second fiber may be oriented in a second direction having a predetermined angle from the first direction. The fibers may be randomly oriented in two or more dimensions. For example, the fibers may be randomly oriented short fibers.

The fiber useful in the invention may be natural or synthetic. An organic fiber may be a polymeric fiber, such as an aramid fiber. Examples of other fibers that may be employed include carbon fibers, glass fibers, and silicon carbide fibers.

A particularly preferred fiber is a carbon fiber. Carbon fibers function well as a reinforcing fiber suitable for increasing stiffness and/or strength of the composite material. One preferred carbon fiber has a length ranging from about 0.1 in about 3 inches. Small amounts of additional fibrillated fibers (<4%) such as acrylic or polyolefin fibers may be added to improve the wet and final strength of the part.

Preferred fibers are generally stiff as characterized by a high tensile modulus. For example, the fibers may have a tensile modulus of about 20 GPa or more, about 50 GPa or more, about 100 GPa or more, about 150 GPa or more, or about 200 GPa or more. The fibers may have a tensile modulus of about 500 GPa or less, or about 300 GPa or less. The fibers may optionally be coated with sizing.

The concentration of the fibers should be sufficiently high so that the fibers can provide the desired reinforcing properties to the composite material. The concentration of fibers within the composite is preferably about 25 weight percent or more, more preferably about 35 weight percent or more, even more preferably about 52 weight percent or more, based on the total weight of the dry composite material. The concentration of fibers is preferably sufficiently low so that a high bulk density (e.g., compared to the fibers without the thermoset material) can be achieved. The concentration of the fibers preferably is about 85 weight percent or less, more preferably about 78 weight percent or less, even more preferably about 70 weight percent or less, and most preferably about 62 weight percent or less, based on the total weight of the dry composite material.

Polymeric Resins

The composition of the invention also comprises a polymeric resin. Exemplary classes of polymeric resin include thermosetting resins and thermoplastic resins.

Thermosets

The composite material may include one or more thermosets as the polymeric resins (i.e., thermosetting resins). The composite material may include one or more thermoset resins that are room temperature solids, room temperature liquids, or both.

The thermoset resin may include linear compounds. For example, the concentration of linear polymer may be about 20 wt. % or more, about 30 wt. % or more, about 40 wt. % or more, about 50 wt. % or more, about 60 wt. % or more, about 70 wt. % or more, about 80 wt. % or more, about 90 wt. % or more, or about 95 wt. % or more, based on the total weight of the thermoset resins and/or based on the total weight of the polymer in the composite material.

A useful thermoset resin may be characterized as room temperature solids. The thermoset resin may be a glassy material having a glass transition temperature of about 10° C. or more, of about 20° C. or more, of about 30° C. or more, of about 4° C. or more, of about 50° C. or more, or of about 60° C. Preferably, the thermoset resin has a sufficiently low glass transition temperature so that it can be processed at temperatures of about 120° C. or less. For example, the thermoset resin may have a glass transition temperature of about 120° C. or less, about 110° C. or less, about 110° C. or less, about 90° C. or less, or about 80° C. or less. The thermoset resin may be a semi-crystalline resin having a melting temperature of about 30° C. to about 270° C. (e.g., from about 30° C. to about 120° C.). The thermoset resins may also comprise a glassy material having a glass transition temperature greater than 25° C. Preferably, the one or more thermoset resins is substantially free of, or entirely free of semi-crystalline resins. If present, the concentration of thermoset resins that are crystalline is preferably about 29 wt. % or less, about 19 wt. % or less, about 9 wt. % or less, or about 4 wt. % or less, based on the total weight of the polymer in the composite material.

The molecular weight of the thermoset resin that is a room temperature solid (i.e., solid thermoset resin) may be sufficiently high so that the thermoset resin has a glass transition temperature of about 30° C. or more, about 40° C. or more, about 50° C. or more, or about 60° C. or more. When the composition includes both solid and liquid thermoset resins, the solid thermoset resin preferably has a relatively high molecular weight compared with the liquid thermoset resin, where the molecular weight is the number average molecular weight of the resin. For example, the ratio of the molecular weight (e.g., number average molecular weight) of the solid thermoset resin to the molecular weight of the liquid thermoset resin may be about 1.1 or more, about 1.4 or more, about 1.8 or more, about 2.4 or more, about 3 or more, or about 4.5 or more.

Preferred solid thermoset resins have an epoxide equivalent weight of about 400 or more, about 600 or more, about 1000 or more, or about 1500 or more. The solid thermoset resin preferably has an epoxide equivalent weight of about 14000 or less, about 6000 or less, about 4000 or less, or about 2500 or less. The solid thermoset resin preferably has a number average molecular weight of about 28000 or less, about 12000 or less, about 8000 or less, or about 5000 or less.

When the polymer dispersions includes both a liquid and a solid thermoset resin (e.g., both a solid epoxy resin and a liquid epoxy resin), the weight ratio of the solid thermoset resin to the liquid thermoset resin preferably is sufficiently high so that the material is tack free at about 5° C. The weight ratio of the solid thermoset resin to the liquid thermoset resin may be about 0.2 or more, about 0.4 or more, about 0.6 or more, or about 0.8 or more. The weight ratio of the solid thermoset resin to the liquid thermoset resin preferably is sufficiently low so that two pieces of the dry composite material can more easily be attached by heating the surface at least one of the pieces. The weight ratio of the solid thermoset resin to the liquid thermoset resin may be about 20 or less, about 10 or less, about 5 or less, about 3 or less, or about 2 or less. Compositions that are substantially free of, or entirely free of liquid thermoset resin (e.g., free of liquid epoxy resin), may also be used in the compositions according to the teachings herein.

A thermoset resin may also be characterized as a room temperature liquid (i.e., a liquid thermoset resin). For example, the thermoset resin may be a liquid material having a glass transition temperature of less than 25° C., of about 20° C. or less, or of about 10° C. or less. The glass transition temperature of the liquid thermoset resin may be about −60° C. or more, about −50° C. or more, about −30° C. or more, or about −10° C. or more. If the glass transition temperature is too low, the thermoset resin may flow out of the mold, may be difficult to handle (e.g., due to tack), may require long cure times, or any combination thereof.

The thermoset resin may include one or any combination of the thermoset resins described in U.S. Pat. No. 5,539,025 (col. 8, line 66 to col. 9, line 62) and/or one or more of the thermoset resins described in Publication No. WO 2009/074293 (page 3, line 31 to page 5, line 2). The thermoset resin may include one or more epoxies, one or more phenolics, one or more polyesters, one or more acrylates, one or more polyamides, one or more polyimides and one or more of polyurethanes, vinyl esters, silicones, or any combination thereof. Preferably, the thermoset resin comprises one or more epoxy resins.

Useful epoxy resins may be a product of polymerization reaction involving an epoxide containing monomer. The epoxide containing monomer may include one or more, or two or more epoxide groups. Some or all of the epoxide containing monomer may be terminal epoxide groups. For example, the epoxide group may include one or more (e.g., two or more) terminal epoxide groups. The polymerization reaction may be a homopolymerization or may be a copolymerization reaction. For example, the epoxide containing monomer that reacts with an epoxide group.

The epoxy resin may include one or more flexibilizing agents or may be free of flexibilizing agents. If employed, the flexibilizing agent may be copolymerized with the epoxide containing monomer, or a separate phase. Preferably, the concentration of flexibilizing agent is about 29 wt. % or less, more preferably about 19 wt. % or less, even more preferably bout 9 wt. % or less based on the total weight of the polymer in the composite material. The epoxy may include an epoxy described in U.S. Pat. No. 5,539,025 (column 6, line 9 to column 7, line 2) or an epoxy resin described in Publication No. WO 2009/074293 (page 5, lines 26-33). Without limitation, the epoxy resin may include one or any combination of the following: an aliphatic glycol based epoxy resin, a bisphenol A based epoxy resin (e.g., A+epichloohydrin), a diglycidyl ether of bisphenol A (DGEBA), a novolac based epoxy resin, or a brominated epoxy resin.

The dispersion may include one or more cross-linking agents (i.e., hardener) suitable for reacting with the thermoset resin. The composition may also include one or more curative catalysts suitable for accelerating the rate of the cross-linking reaction. The cross-linking agent and/or the curative catalyst may be encapsulated. The cross-linking agent and/or the curative catalyst may be in a particle phase, such as a particle phase including a solid thermoset resin, a particle including a thermoplastic resin, or any combination thereof. The cross-linking agent and/or the curative catalyst may be soluble in the liquid matrix phase of the dispersion. Preferably, one or both of the cross-linking agent and the curative catalyst are not in some or all off the particles that contain the solid thermoset resin. It will be appreciated that the cross-linking agent and/or the curative catalyst may be provided to the fibers separately from the dispersion.

The cross-linking agent may react with one or more of functional sites of the thermoset resin. The thermoset resin, the cross-linking agent, or both may be a compound having a sufficiently high functionality so that a network structure is formed. The functionality of a compound (e.g., a thermoset resin or a cross-linking agent) describes the number of reactive sites on the compound that may be employed in a cross-linking reaction, such as a chemical cross-linking reaction used for curing the thermoset resin. For example, a resin having 2 terminal reactive epoxide groups has a functionality of 2. As another example, a diamine including two terminal —NH$_2$ groups has a functionality of 4. The cross-linking reaction may employ a step of reacting a functional group of the thermoset resin with a functional group of the cross-linking agent.

The cross-linking agent and/or curative catalyst are preferably selected and present in a sufficient quantity so that the thermoset resin rapidly cross-links when heated in the molding process according to the teachings herein.

The cross-linking reaction may be evaluated at one more of the following curing temperatures, Tc: about 100° C., about 110° C., about 120° C., about 130° C., about 140° C., or about 150° C. and at one or more of the following target curing times: about 10 minutes, about 5 minutes, about 3 minutes, about 2 minutes, about 1 minute, or about 30 second. The cross-linking agent and/or curative catalyst are preferably selected and present in a sufficient quantity so that after reacting for the target cure time, the thermoset resin achieves a glass transition temperature equal to or greater than Tc-10° C., more preferably equal to or great than −5° C. or more, even more preferably equal to or greater than Tc+5° C., even more preferably equal to or greater than Tc+10° C., and most preferably equal to or greater than Tc+15° C. The glass transition temperature on the cured material is measured using dynamic mechanical thermal analysis (DMTA). Dynamic mechanical thermal analysis (DMTA) is performed using a TA Instruments ARES G2 rheometer. Specimens are cut from the composite material. The specimen may be cut from the same panels which are used to obtain specimens for flexural modulus testing. The DMTA specimens have a rectangular geometry with dimensions of 1.75×0.5 inch (length×width) and are cut to dimension using a wet circular mechanical saw. The specimen is loaded onto a torsion rectangular sample fixture at 30° C. During testing, small-amplitude oscillatory shear experimental conditions are employed, including a fixed oscillation frequency of 1 Hz and a strain amplitude of 2%. A temperature ramp from 30 to 220° C. at 3° C./min is employed. Nitrogen is imposed on the sample and the temperature is controlled with a forced-air temperature controller.

The amount of the hardener in the composition is preferably about 0.5 or more, more preferably about 0.6 or more, and most preferably about 0.7 or more equivalents with respect to the active hydrogen equivalents of all of the epoxy groups in the composition. The amount of the hardener in the composition is preferably about 3.0 or less, more preferably about 2.0 or less, even more preferably about 1.6 or less, even more preferably bout 1.4 or less, and most preferably about 1.3 or less equivalents with respect to the active hydrogen equivalent of all of the epoxy groups in the composition. The amount of the hardener component in the composition is preferably about 1 part or more, more preferably about 2 parts or more, even more preferably about 3 parts or more, and most preferably about 4 parts or more, by weight, based on the total parts of epoxy resin in the composition. The amount of the hardener component is preferably about 25 parts or less, more preferably about 20 parts or less, even more preferably about 15 parts or less, and most preferably about 10 parts or less, by weight, based on the total weight of the one or more epoxy resins in the composition.

The composition may optionally include one or more cure accelerators suitable for increasing the rate of curing the thermoset resin, suitable for increasing the glass transition temperature of the cured thermostat resin, or both.

The dispersion particles may optionally include one or more polymer modifiers suitable for improving the mechanical properties of the thermoset resin. For example, the polymer modifier may increase the impact properties and/or the tensile elongation (e.g., the elongation at failure) of the cured thermoset resin. Some modifiers may additionally function as a cross-linking agent.

Thermoplastics

The composition of the polymeric resin in the invention may further comprise one or more thermoplastic resins. The use of a thermoplastic resin may take advantage of one or any combination of the following characteristics possible in a thermoplastic (e.g., compared with the thermoset resin) including relatively high toughness, relative high fatigue resistance, ability to fuse or join (e.g., by melting the thermoplastic), relatively good storage stability (e.g., relatively constant viscosity over time), and relatively easy to reprocess and/or repair.

The thermoplastic resin may include one or more homopolymers, one or more copolymers, or both. Examples of thermoplastic resin that may be employed include polyolefins, polybutylene terephthalates, acrylonitrile-butadiene-styrene copolymers (ABS), polyamides, polyethylene terephthalates, polymethacrylates, polyvinyl acetal resins, polyvinyl acetates, polyacetal, polyphenylene sulfides, polyether sulfones, phenoxy resins, polyurethanes, silicones, or any combination thereof.

The thermoplastic resin may include one or more polymers suitable for toughening the thermoset resin so that the impact strength is increased. Particularly preferred tougheners include polymers having rubbers, copolymers, or both, such as a butadiene-acrylonitrile copolymer, a carboxyl-modified butadiene-acrylonitrile copolymer, core shell polymers including rubber particles, and an acrylate copolymer.

Other preferred thermoplastics include polyolefins. Preferred polyolefins include one or more olefin monomers having 2 to 20 carbon atoms. The polyolefin may be a homopolymer or a copolymer including a first olefin monomer and one or more second monomers. The one or more second monomers may include one or more olefins, one or more non-olefinic monomers, or both. The first olefin may be ethylene, propylene, 1-butene, or 1-hexene. The second monomer may be of one or more monomers such as ethylene, propylene, 1-butene, 1-hexane, 1-octene, vinyl acetate, butyl acrylate, methyl methacrylate, styrene, acrylic acid, and methyl acrylate, with the proviso that the second monomer is different from the first olefin. The second monomer may be one or more olefins. Preferably, the total concentration of the first olefin and the second monomer (e.g., one or more second monomers listed above) is about 90 weight percent or more, and most preferably about 99 weight percent or more. Particularly preferred polyolefins that may be employed include polypropylene homopolymers, polypropylene copolymers, polyethylene homopolymers, and polyethylene copolymers. Other particularly preferred polyolefins include copolymers of ethylene, propylene, or both, with one or more polar monomers.

Other preferred thermoplastics include polyesters such as polyethylene terephthalate, polybutylene terephthalate, and copolymers thereof. Useful thermoplastics also include polyamides which are generally polymers having one or more repeating units that includes an amide group along with the backbone of the polymer chain. For example, polyamides may be a reaction product of a diamine and a diacid. Other examples of polyamides include monadic polyamides. Generally, monadic polyamides are formed by a ring opening reaction. Exemplary polyamides which are formed from a diamine and a diacid may include polyamides (e.g., polyamides) containing reaction products of either adipic acid or terephthalic acid with a diamine. Exemplary monadic polyamides include polyamide 6, and poly(p-benzamide). The polyamide may be a homopolymer, a copolymer, or a mixture thereof. Preferred polyamide homopolymers which may be used in the present invention include polyamide 3, polyamide 4, polyamide 5, polyamide 6, polyamide 6T, polyamide 66, polyamide 610, polyamide 610, polyamide 612, polyamide 69, polyamide 7, polyamide 77, polyamide 8, polyamide 9, polyamide 10, polyamide 11, polyamide 12, and polyamide 91, Copolymers containing any of the above-mentioned polyamides may also be used. Polyamide copolymers may be random copolymers, block copolymers, or a combination thereof. Examples of polyamide copolymers include polymers having a plurality of different amides (i.e., a polyamide-polyamide copolymer) polyesteramide copolymers, polyetheresteramide copolymers, polycarbonate-ester amides, or any combination thereof.

Representative Dispersion Constituents

TABLE 1

| | (wt-%) | |
|---|---|---|
| | Useful | More Preferred |
| Fiber | 20-80 | 30-60 |
| Polymer Resin | 20-80 | 30-60 |
| Catalyst | 0-30 | 0-20 |
| Adjuvants | 0-10 | 0-5 |
| Diluent | q.s. | q.s. |

EXAMPLES

The following examples provide a non-limiting illustration of certain aspects of the invention.

Dispersion Example 1

Epoxy Dispersion Example 1 prepared using steps described in U.S. Pat. Nos. 5,539,021, 5,688,842, and 8,063,128, and U.S. Publication No. 2005/0100754A1, all of which are incorporated herein by reference. Epoxy resin (50/50 DER6508/DEN 438) was mechanically dispersed in 50% water. Separately, a curing agent slurry was formed by mixing Technicure Nano Dicy, 8.5 parts per hundred resin (phr) or 19.995% by weight, Omicure 410M 7 phr or 16.467% by weight, Mowiol 4-88 Solution (20% PVOH in water) 3.1 phr or 7.292% by weight, and water 24 phr or 56.246% by weight. The curing agent 8.75% and epoxy dispersion 41.25% were then mixed with 50% deionized water to give a solution with approximately 25% solids.

Dispersion Example 2

Dispersion Example 2 was prepared as described above, using a curing agent (17.5%) mixed with the epoxy dispersion (82.5%) to give a solution with approximately 50% solids.

Dispersion Example 3

Dispersion Example 3 is prepared as described in Dispersion Example 2 using a curing agent slurry formed by mixing Technicure Nano Dicy, 8.5 phr or 21.46% by weight, Omicure 410M 4 phr or 10.1% by weight, and Mowiol 4-88 Solution (20% PVOH in water) 3.1 phr or 7.82% by weight, and water 24 phr or 60.6% by weight.

Dispersion Example 4

Dispersion Example 4 is prepared as described in Dispersion 2 using a curing agent slurry formed by mixing Technicure Nano Dicy, 6 phr or 16.17% by weight, Omicure 410M 4 phr or 10.7% by weight, and Mowiol 4-88 Solution (20% PVOH in water) 3.1 phr or 8.36% by weight, and water 24 phr or 64.9% by weight.

Composite Example 1

In this example, a large tank with cross-sectional dimension larger than the final desired part was used, enabling high dilution, and trimming of the edges of the epoxy-infused fiber charge. A 16 inch diameter 15-gallon cylindrical tank made of high density polyethylene from Saint Gobain Performance Plastics with a 2 inch opening in the center of the bottom and a ½ inch opening ball valve was fitted with a 16 inch diameter 3×3 mesh (0.253 inch opening) stainless steel wire cloth covering the entire bottom and a 16 inch diameter 60×60 mesh (0.009 inch opening) stainless steel woven wire cloth covering the more porous mesh. 15 gallons of epoxy dispersion example 1 were added to the tank, along with 60 g of carbon fiber (1 inch chopped Dow Aksa A42, D012 sizing, 12 k tows). The fibers were mixed in the dispersion until the tows were fully separated (~2 minutes), then the ball valve was opened and the fiber is drained onto the stainless steel mesh.

As an optional step, the fibers were scraped off the side as the liquid is drained to prevent loss of fiber. The fiber mat that is made is stable to be picked up and moved around, however takes in about 20× its weight in dispersion. Excess dispersion is removed mechanically with a stainless steel roller until the mat weighs 5× its original weight (fiber+4× its weight in 25% dispersion). The mat was then allowed to dry under air flow for 12 hours, followed by drying under vacuum for 48 hours, all at room temperature, until the water is removed, giving a mat with 50% resin and 50% fiber. The mat was then molded according to standard molding techniques. 4 Mats were cut into 12 by 12 inch squares, stacked, and heated to 140° C. and compressed under 150 bar for 10 minutes.

Composite Examples 2-4

Samples were made as described in Composite Example 1 using, respectively, 1 inch Dow Aksa Z-011-12K fiber as Composite Example 2, 1 inch Mitsubishi M-48 fiber as Composite Example 3, and 1 inch Toray T700 GC-12K fiber as Composite Example 4.

Comparative Composite Example 5

A square tank 11×11 inches was formed by cutting the top off a 4-Gallon square rinse tank purchased from US plastics. A 1¼ inches opening ball valve purchased from McMaster Carr was added to the spinweld fitting. Two layers of stainless steel mesh as described in composite example 1 were cut into an 11×11 inch square and fitted to the bottom. Three gallons of epoxy dispersion 1 and 20 g of carbon fiber was added to the tank. The fiber was mixed in the tank until all the tows are separated and wetted, (~2 minutes) then the ball valve is opened and the dispersion is drained, leaving the fiber mat on the stainless mesh. Excess dispersion is removed by stainless steel roller until the mat weighs 5× its original weight (fiber+4× its weight in 25% dispersion). The mat was then allowed to dry under air flow for 12 hours, followed by drying under vacuum for 48 hours, all at room temperature, until the water is removed. The mat was then molded according to standard molding techniques. 8 mats were cut into 10 by 10 inch squares, stacked, heated to 140° C. and compressed under 150 bar for 10 minutes.

Comparative Composite Example 6. Hand-Formed Mat-Sheet Moulding Compound

The epoxy dispersion was made as described in Dispersion Examples 1-4. 47.5 grams of carbon fiber were randomly sprinkled onto a plastic release sheet. 98 grams of epoxy Dispersion 2 was then evenly poured over the fiber mat. If poured slowly, the dispersion is fully absorbed. The mat was then allowed to dry under air flow for 12 hours, followed by drying under vacuum for 48 hours, all at room temperature, until the water is removed. The mat was then molded according to standard molding techniques. Four mats were cut into 10 by 10 inch squares, stacked, and heated to 150° C. and compressed under 150 bar for 10 minutes.

direction. In addition, the epoxy does not evenly coat the tows. At the two different dilutions of papermaking process, it can be seen that with high dilution in Composite Example 1 the tows are better broken up, more randomized, and more evenly coated with epoxy as compared to Composite Example 5.

Example 7. Filtering Effect Experiments

Figure 1:
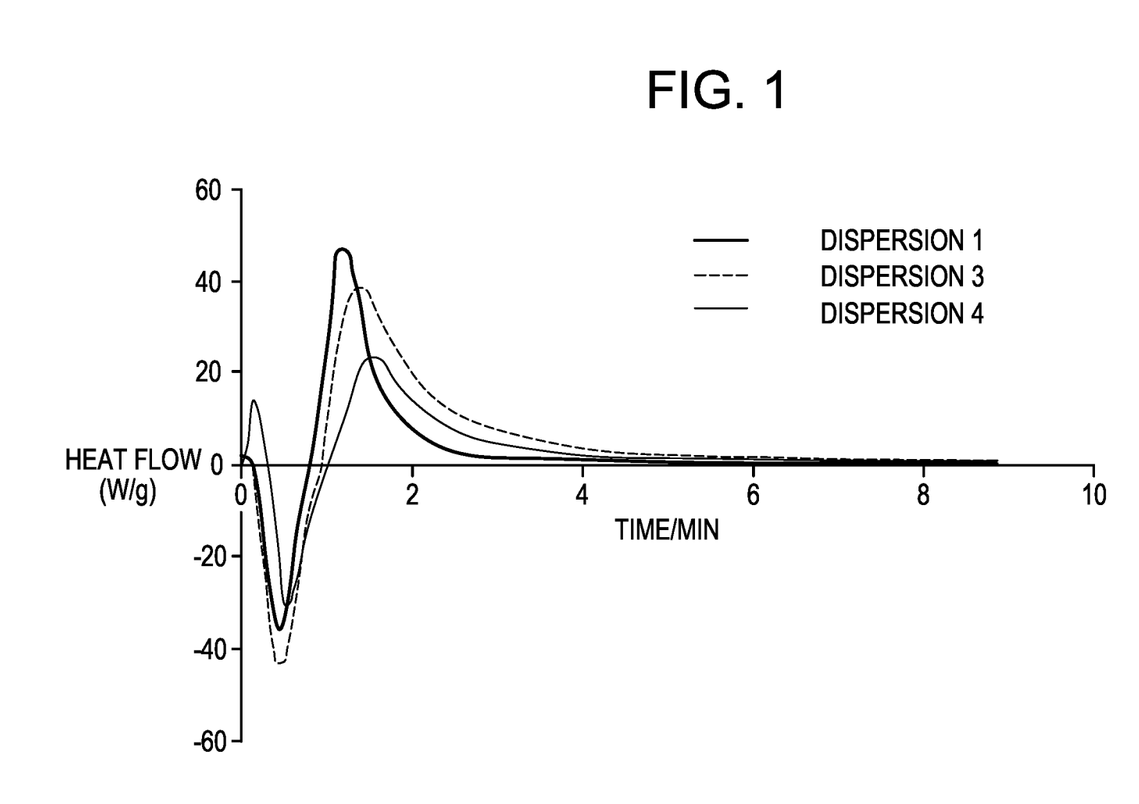
FIGS. 1 and 2 are graphical depictions of heat flow data for exemplary dispersions and mats.

Using the setup described in Comparative Composite Example 6, 3 gallons of freshly made epoxy dispersion 1 was added to the tank. A sample of fresh epoxy dispersion 1. 3 and 4 were allowed to dry on a glass slide. Eight mats were made and dried as described above using 20 grams of fiber. A small sample was taken from the 1st mat, the 4th mat, and the 8th mat and the 3 dispersions that were dried on a glass slide and run using DSC as described above. Cure time is reported as the onset point of the return to no heat transfer after the temperature is ramped to 150° C. as defined by the TA universal analysis software. See Table 3 and FIG. 1.

TABLE 2

| Example | Initial $T_g$ (° C.) | Final $T_g$ (° C.) (DSC) | Final $T_g$ (° C.) (DMA) | Storage Modulus (GPa) | Young's Modulus (GPa) | YM StDev (GPa) | Tensile Strength (MPa) | TS StDev (MPa) |
|---|---|---|---|---|---|---|---|---|
| 1 | 14.8 | 138.6 | 165.5 | 15.4 | 33.0 | 3.2 | 75.5 | 18 |
| 2 | 20.7 | 134.6 | 162.2 | 15.8 | 28.4 | 2.2 | 125.0 | 33.4 |
| 3 | 21.3 | 133.5 | 164.5 | 17.7 | 35.1 | 1 | 144.5 | 20 |
| 4 | 19.5 | 137.4 | 162.0 | 15.1 | 31.0 | 3.1 | 190.0 | 41.5 |
| 5 | 17.3 | 140.5 | 163.3 | 16.5 | 31.2 | 4.2 | 99.2 | 34 |
| 6 | 16.7 | 140.8 | 163.9 | 11.9 | 25.2 | 2.3 | 81.4 | 9.2 |

5-15 mg samples punched from the mats that were dried prior to molding were run on a TA instruments Q1000 Differential Scanning Calorimeter. A 5-step method was run to obtain initial glass transition temperature (Initial Tg), glass transition temperature after curing (final Tg) and to compare curing kinetics. The method consisted of:
1. Equilibration at −30° C.
2. Ramp 10° C./min from −30° C. to 90° C.
3. Ramp 200° C./min from 90° C. to 150° C. and hold for 15 minutes
4. Cool 20° C./min to 25° C.
5. Ramp 20° C./min to 250° C.

Dynamic Mechanical Analysis of the cured molds was performed on a TA Instruments Q800 DMA, with parts cut with dimensions 3.5 cm×13.33 cm by a circular saw. A temperature ramp from 25° C. to 203° C. at 5° C./min in air with a fixed oscillation frequency of 1 Hz and 1% strain amplitude was performed to give an additional measure of final Tg and Storage Modulus. Additional mechanical tests included tensile modulus and tensile strength, performed according to ASTM Standard D3039 on molded parts.

Scanning Electron Microscopy was performed on an FEI Inspect. Energy Dispersive X-Ray Spectroscopy (EDX) was performed on the Hitachi TM-3000.

SEM at both 100× and 1000× magnification was completed on samples taken from the mats prior to molding from Examples 1, 5 and 6. Comparative Example 6 had tows that had not broken up, and many are still aligned in the same

TABLE 3

| Glass Slide | DICY (phr) | Omicure (phr) | Initial $T_g$ (° C.) | Final $T_g$ (° C.) | Cure Time (min) |
|---|---|---|---|---|---|
| Dispersion 1 | 8.5 | 7 | 17.4 | 138.3 | 2.3 |
| Dispersion 3 | 8.5 | 4 | 18.6 | 139.0 | 3.0 |
| Dispersion 4 | 6 | 4 | 21.4 | 144.0 | 3.4 |

TABLE 4

| Mat | Initial $T_g$ (° C.) | Final $T_g$ (° C.) | Cure Time (min) |
|---|---|---|---|
| 1 | 17.3 | 140.5 | 2.4 |
| 4 | 17.0 | 143.9 | 2.4 |
| 8 | 18.2 | 142.9 | 2.4 |

Figure 2:
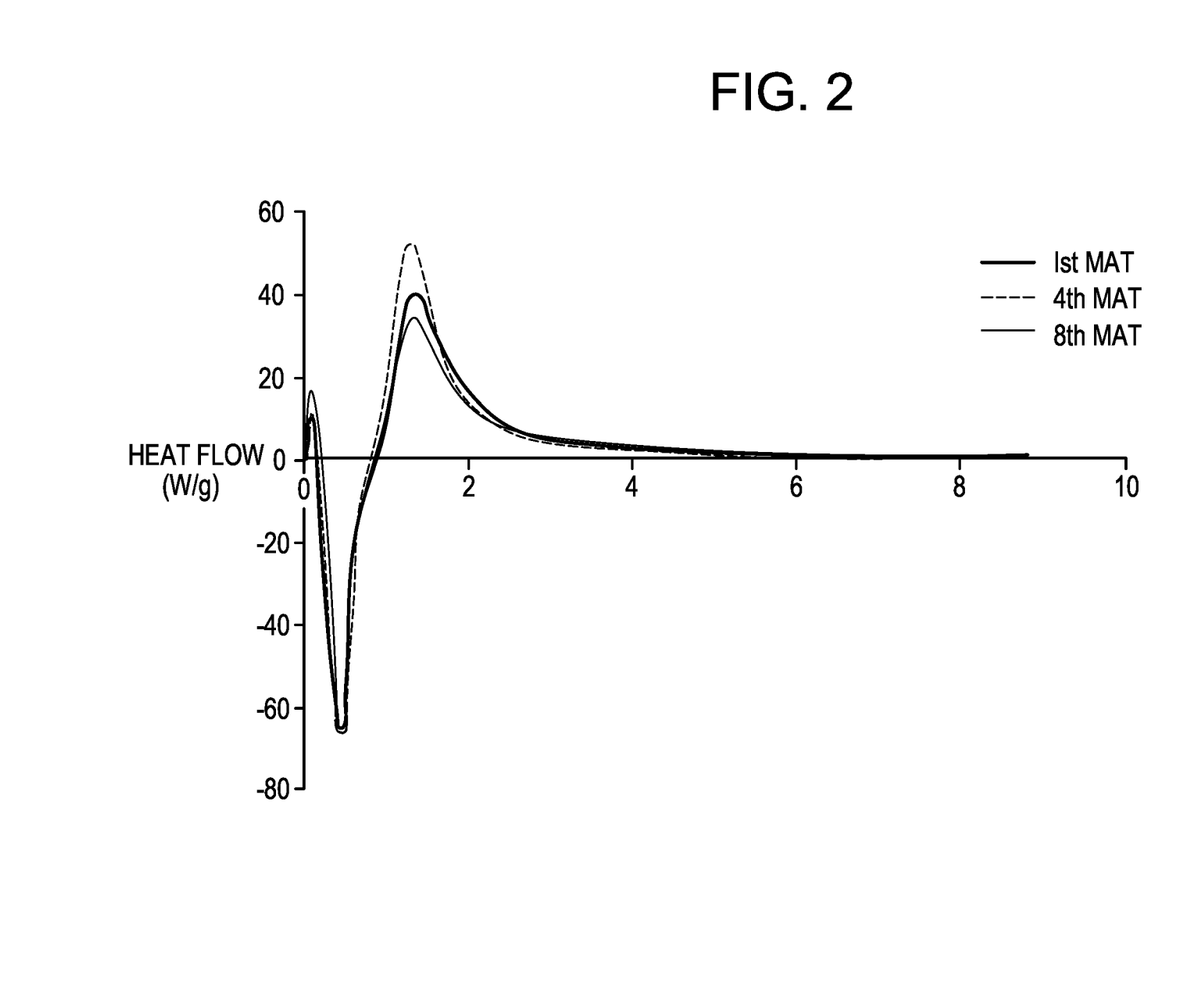

When the curing agent ratio is modified, a difference in cure kinetics is observed. Little change to initial $T_g$, final $T_g$, or cure time is observed in the 1$^{st}$ through 8$^{th}$ mat. There is a visible difference, although no trend, in the magnitude of heat flow likely due to differences in exact fiber:resin ratio. See Table 4 above and FIG. 2.

Example 8. Fiber Length

Mat was made as described in Example 5, however ½ inch Dow Aksa A42 D012 12 k fiber was used. Mat formed properly and cured properly as determined by DSC giving an initial $T_g$ of 16.6 (° C.), a final $T_g$ of 143.1 (° C.) and a cure time of 2.44 min.

Example 9. Filtered Particles

In an alternative example, larger particle sizes can be filtered. Using the setup described in composite example 2, 20 g of Licolub® WE 4, commercially available from Clariant, (600-1000 micron) was added to 3 gallons of epoxy dispersion. 20 g of fiber was added. The fiber was mixed in the tank until all the tows are separated and wetted, (~2 minutes) then the ball valve is opened and the dispersion is drained, leaving the fiber mat on the stainless mesh. Excess dispersion is removed by roller until the mat weights 5× its original weight (fiber+4× its weight in 25% dispersion). The mat was then allowed to dry under air flow for 12 hours, followed by drying under vacuum for 48 hours, all at room temperature until the water is removed. Unlike previous examples, instead of obtaining a mat with 50% carbon fiber and 50% resin, or what should have been 40 g, a mat of weight 54.5 g was obtained. This indicated a large proportion of the Licolub® added to the tank was taken up by the fiber. Licolub® was observed throughout the mat.

Although the invention has been described by reference to its preferred embodiment as is disclosed in the specification and drawings above, many more embodiments of the invention are possible without departing from the invention. Thus, the scope of the invention should be limited only by the appended claims.

The claimed invention is:

1. A method of preparing a resin infused random fiber mat comprising the steps of:
   a. forming a slurry comprising fiber and a liquid dispersion of polymeric resin,
   b. forming a resin infused random fiber mat from the slurry by depositing the slurry onto a porous substrate,
   c. removing excess liquid dispersion from the formed resin infused random fiber mat, wherein the removed excess liquid dispersion is a stable dispersion,
   d. drying the resin infused random fiber mat to remove water, and
   e. curing the resin infused random fiber mat.

2. The method of claim 1, wherein the liquid dispersion of polymeric resin comprises a thermoset resin comprising one or more of room temperature solids, room temperature liquids, and curing agent.

3. The method of claim 1, wherein the liquid dispersion comprises from about 20% to about 80% polymeric resin by weight.

4. The method of claim 1, wherein the fiber comprises carbon fiber with a length of about 0.1 inch to about 3 inches and present in the slurry in a concentration ranging from about 0.01 gram per liter to about 10 grams per liter.

5. The method of claim 1, additionally comprising the step of cutting the resin infused random fiber mat before curing.

6. The method of claim 1, additionally comprising the step of shaping the resin infused random fiber mat in a mold.

7. The method of claim 1, wherein said method is run in a continuous manner.

8. The method of claim 1, wherein the mat is formed by wet laying the liquid dispersion on the surface of a screen.

9. The method of claim 1, wherein said mat is formed by pumping the liquid dispersion under vacuum onto the substrate.

10. The method of claim 1, wherein the liquid dispersion additionally comprises a solvent having a polarity index ranging from about 5 to about 9.

11. A composite article comprising resin and fiber cured and formed on a porous substrate resulting from the method of claim 1.

12. The method of claim 1, wherein the removed liquid dispersion undergoes no modification of a ratio of catalyst: polymeric resin:water.

\* \* \* \* \*